(12) United States Patent
Komatsu et al.

(10) Patent No.: US 11,820,461 B2
(45) Date of Patent: Nov. 21, 2023

(54) BICYCLE CONTROLLER FOR ASSISTING TRAVEL OF A BICYCLE

(71) Applicant: Shimano Inc., Osaka (JP)

(72) Inventors: Atsushi Komatsu, Osaka (JP); Yuta Kurokawa, Osaka (JP); Shingo Sakurai, Osaka (JP)

(73) Assignee: Shimano Inc., Osaka (JP)

( * ) Notice: Subject to any disclaimer, the term of this patent is extended or adjusted under 35 U.S.C. 154(b) by 231 days.

(21) Appl. No.: 17/243,051

(22) Filed: Apr. 28, 2021

(65) Prior Publication Data

US 2021/0245833 A1 Aug. 12, 2021

Related U.S. Application Data

(62) Division of application No. 15/975,944, filed on May 10, 2018, now Pat. No. 11,021,210.

(30) Foreign Application Priority Data

Jul. 10, 2017 (JP) ................. 2017-134789

(51) Int. Cl.
| | |
|---|---|
| *B62M 6/45* | (2010.01) |
| *B62J 1/02* | (2006.01) |
| *B62K 25/04* | (2006.01) |
| *B62K 25/28* | (2006.01) |
| *B62M 6/55* | (2010.01) |
| *B62K 25/12* | (2006.01) |
| *B62J 1/00* | (2006.01) |

(52) U.S. Cl.
CPC .................. *B62M 6/45* (2013.01); *B62J 1/02* (2013.01); *B62K 25/04* (2013.01); *B62K 25/12* (2013.01); *B62K 25/286* (2013.01); *B62M 6/55* (2013.01); *B62J 1/00* (2013.01); *B62K 2025/044* (2013.01); *B62K 2025/047* (2013.01)

(58) Field of Classification Search
CPC ..... B62M 6/45; B62M 6/55; B62J 1/02; B62J 1/00; B62K 25/04; B62K 25/12; B62K 25/286; B62K 2025/044; B62K 2025/047
USPC ........................................................ 701/22
See application file for complete search history.

(56) References Cited

U.S. PATENT DOCUMENTS

| | | | |
|---|---|---|---|
| 6,213,236 B1 * | 4/2001 | Yokoyama | ............... B62M 7/04 180/205.3 |
| 8,777,804 B2 * | 7/2014 | Takachi | ................ B62M 25/08 477/3 |
| 2003/0094784 A1 | 5/2003 | Miyoshi | |
| 2006/0064223 A1 | 3/2006 | Voss | |

(Continued)

FOREIGN PATENT DOCUMENTS

| | | | | |
|---|---|---|---|---|
| CN | 102963483 A | * | 3/2013 | ............. B60L 50/20 |
| CN | 102963486 A | * | 3/2013 | ............. B62M 6/45 |

(Continued)

*Primary Examiner* — B M M Hannan
(74) *Attorney, Agent, or Firm* — Global IP Counselors, LLP

(57) ABSTRACT

A bicycle control device includes an electronic controller configured to control an operational state of an electric auxiliary drive to a manual drive driving force inputted to the bicycle. The electric auxiliary drive assists in travel of a bicycle based on an operational state of a suspension of the bicycle. The electronic controller controls the operational state so that the bicycle is assisted at an assist ratio of the electric auxiliary drive.

13 Claims, 9 Drawing Sheets

(56) References Cited

U.S. PATENT DOCUMENTS

| | | |
|---|---|---|
| 2009/0192673 A1 | 7/2009 | Song et al. |
| 2010/0327542 A1 | 12/2010 | Hara et al. |
| 2011/0109060 A1 | 5/2011 | Earle et al. |
| 2011/0168471 A1 | 7/2011 | Duignan |
| 2012/0221202 A1* | 8/2012 | Ikemoto .............. B60G 17/018 701/37 |
| 2012/0221204 A1 | 8/2012 | Ichida et al. |
| 2012/0221205 A1 | 8/2012 | Ichida et al. |
| 2012/0253598 A1* | 10/2012 | Shirai .................. B62K 25/04 701/37 |
| 2012/0253600 A1 | 10/2012 | Ichida et al. |
| 2013/0138281 A1 | 5/2013 | Chien et al. |
| 2013/0334874 A1* | 12/2013 | Shirai .................. B62M 25/08 307/9.1 |
| 2014/0088828 A1* | 3/2014 | Wesling ............... B60G 17/018 701/37 |
| 2014/0210180 A1* | 7/2014 | Hudak ................. B62K 15/00 280/274 |
| 2015/0009019 A1 | 1/2015 | Watarai et al. |
| 2015/0061241 A1 | 3/2015 | Walthert et al. |
| 2015/0073656 A1 | 3/2015 | Takamoto et al. |
| 2015/0120119 A1 | 4/2015 | Tauchi et al. |
| 2015/0136508 A1 | 5/2015 | Strothmann |
| 2015/0175236 A1 | 6/2015 | Walthert et al. |
| 2015/0197308 A1 | 7/2015 | Butora et al. |
| 2015/0367750 A1* | 12/2015 | Takamoto ............. B62K 11/00 701/22 |
| 2016/0121730 A1* | 5/2016 | Fujita ................... B60L 50/50 701/22 |
| 2016/0159433 A1* | 6/2016 | Nishikawa ........... B62M 25/04 701/22 |
| 2016/0207588 A1* | 7/2016 | Tsuchizawa .......... B62M 9/132 |
| 2016/0207589 A1* | 7/2016 | Tsuchizawa .......... B62M 6/45 |
| 2016/0311500 A1* | 10/2016 | Kasai ................... B62J 43/30 |
| 2017/0029057 A1* | 2/2017 | Kato .................... B62J 6/16 |
| 2017/0137088 A1* | 5/2017 | Watarai ............... B62M 11/145 |
| 2017/0334514 A1* | 11/2017 | Chen ................... B62M 6/55 |
| 2018/0037294 A1 | 2/2018 | Kurotobi et al. |
| 2019/0009771 A1 | 1/2019 | Komatsu et al. |
| 2019/0009780 A1 | 1/2019 | Komatsu et al. |
| 2019/0009859 A1* | 1/2019 | Komatsu .............. B62M 6/45 |

FOREIGN PATENT DOCUMENTS

| | | | | |
|---|---|---|---|---|
| EP | 2505479 A1 | * | 10/2012 | ........... B60L 1/08 |
| JP | H09142368 A | * | 6/1997 | |
| JP | H09150778 A | * | 6/1997 | |
| JP | H10203465 A | * | 8/1998 | |
| JP | 11-171081 A | | 6/1999 | |
| JP | 2000-108980 A | | 4/2000 | |
| JP | 2002-225776 A | | 8/2002 | |
| JP | 2004-345366 A | | 12/2004 | |
| JP | 2005-351470 A | | 12/2005 | |
| JP | 2012-179976 A | | 9/2012 | |
| JP | 6005110 B2 | | 9/2016 | |
| JP | 6675110 B2 | * | 4/2020 | ........... B62M 6/55 |
| KR | 20020070650 A | * | 9/2002 | |

* cited by examiner

| Front Suspension | | | Rear Suspension | | | Electric Auxiliary Drive |
|---|---|---|---|---|---|---|
| Movement State | Travel Amount | Repulsion Force | Movement State | Travel Amount | Repulsion Force | Operation Mode |
| Locked | | | Locked | | | 1st Operation Mode |
| Unlocked | Same | | Unlocked | Same | | 2nd Operation Mode |
| | Large | | | Small | | |
| | Small | | | Large | | 3rd Operation Mode |

Fig.3

| Front Suspension | | | Rear Suspension | | | Electric Auxiliary Drive |
|---|---|---|---|---|---|---|
| Movement State | Travel Amount | Repulsion Force | Movement State | Travel Amount | Repulsion Force | Operation Mode |
| Locked | | | Locked | | | 1st Operation Mode |
| Unlocked | | Same | Unlocked | | Same | 2nd Operation Mode |
| | | Large | | | Small | |
| | | Small | | | Large | 3rd Operation Mode |

Fig.4

| Front Suspension | | | Rear Suspension | | | Adjustable Seatpost | Electric Auxiliary Drive |
|---|---|---|---|---|---|---|---|
| Movement State | Travel Amount | Repulsion Force | Movement State | Travel Amount | Repulsion Force | Adjustable Seatpost Height | Operation Mode |
| Locked | | | Locked | | | 1st Range | 1st Operation Mode |
| Unlocked | | | Unlocked | Same | | | |
| Unlocked | Same | | Unlocked | Small | | 2nd Range | 2nd Operation Mode |
| Unlocked | Large | | Unlocked | Large | | | |
| Unlocked | Small | | | | | | 3rd Operation Mode |

Fig.5

| Front Suspension | | | Rear Suspension | | | Adjustable Seatpost | | Electric Auxiliary Drive |
|---|---|---|---|---|---|---|---|---|
| Movement State | Travel Amount | Repulsion Force | Movement State | Travel Amount | Repulsion Force | Adjustable Seatpost Height | | Operation Mode |
| Locked | | | Locked | | | 1st Range | | 1st Operation Mode |
| Unlocked | | Same | Unlocked | | Same | | | 2nd Operation Mode |
| Unlocked | | Large | Unlocked | | Small | 2nd Range | | |
| Unlocked | | Small | Unlocked | | Large | | | 3rd Operation Mode |

Fig.6

| Front Suspension | | | Rear Suspension | | | Electric Auxiliary Drive |
|---|---|---|---|---|---|---|
| Movement State | Travel Amount | Repulsion Force | Movement State | Travel Amount | Repulsion Force | Operation Mode |
| Locked | / | / | Locked | / | / | 1st Operation Mode |
| Unlocked | Same | Same | Unlocked | Same | Same | 2nd Operation Mode |
| Unlocked | Same | Large | Unlocked | Same | Small | 2nd Operation Mode |
| Unlocked | Large | Same | Unlocked | Small | Same | 2nd Operation Mode |
| Unlocked | Large | Large | Unlocked | Small | Small | 2nd Operation Mode |
| Unlocked | Small | Large | Unlocked | Large | Same | 3rd Operation Mode |
| Unlocked | Small | Large | Unlocked | Large | Small | 3rd Operation Mode |
| Unlocked | Same | Small | Unlocked | Same | Large | 3rd Operation Mode |
| Unlocked | Large | Small | Unlocked | Small | Large | 3rd Operation Mode |

Fig.9

| Front Suspension | | | Rear Suspension | | | Adjustable Seatpost | Electric Auxiliary Drive |
|---|---|---|---|---|---|---|---|
| Movement State | Travel Amount | Repulsion Force | Movement State | Travel Amount | Repulsion Force | Adjustable Seatpost Height | Operation Mode |
| Locked | — | — | Locked | — | — | 1st Range | 1st Operation Mode |
| Unlocked | — | — | Unlocked | — | — | 1st Range | 2nd Operation Mode |
| Locked | — | — | Locked | — | — | 2nd Range | 2nd Operation Mode |
| Unlocked | Same | Same | Unlocked | Same | Same | 2nd Range | 2nd Operation Mode |
| Unlocked | Same | Large | Unlocked | Same | Small | 2nd Range | 2nd Operation Mode |
| Unlocked | Large | Same | Unlocked | Small | Same | 2nd Range | 2nd Operation Mode |
| Unlocked | Large | Large | Unlocked | Small | Small | 2nd Range | 2nd Operation Mode |
| Unlocked | Small | Same | Unlocked | Large | Same | 2nd Range | 2nd Operation Mode |
| Unlocked | Small | Large | Unlocked | Large | Small | 2nd Range | 2nd Operation Mode |
| Unlocked | Same | Small | Unlocked | Same | Large | 2nd Range | 3rd Operation Mode |
| Unlocked | Large | Small | Unlocked | Small | Large | 2nd Range | 3rd Operation Mode |

Fig. 10

BICYCLE CONTROLLER FOR ASSISTING TRAVEL OF A BICYCLE

CROSS-REFERENCE TO RELATED APPLICATIONS

This application is a divisional application of U.S. patent application Ser. No. 15/975,944, filed on May 10, 2018. This application claims priority to Japanese Patent Application No. 2017-134789, filed on Jul. 10, 2017. The entire disclosures of U.S. patent application Ser. No. 15/975,944 and Japanese Patent Application No. 2017-134789 are hereby incorporated herein by reference.

BACKGROUND

Technical Field

The present disclosure generally relates to a bicycle control device, an electric auxiliary drive including a bicycle control device, a suspension including a bicycle control device, and an adjustable seatpost including a bicycle control device.

Background Information

A known bicycle control device controls an operational state of an electric auxiliary drive assisting in travel of a bicycle. For example, Japanese Patent No. 6005110 (patent document 1) describes a bicycle including a bicycle control device controlling an electric auxiliary drive in accordance with an operation of an operating device.

SUMMARY

The operational state of the electric auxiliary drive affects the traveling environment provided to the rider. Thus, it is preferred that the electric auxiliary drive is controlled taking into consideration the relationship with the traveling environment provided to the rider.

One object of the present invention is to provide a bicycle control device comprising an electronic controller configured to control an operational state of an electric auxiliary drive to a manual drive driving force inputted to the bicycle. The electric auxiliary drive assists in travel of a bicycle based on an operational state of a suspension of the bicycle. The electronic controller controls the operational state so that the bicycle is assisted at an assist ratio of the electric auxiliary drive.

BRIEF DESCRIPTION OF THE DRAWINGS

Referring now to the attached drawings which form a part of this original disclosure.

FIG. 3 is a control table showing one example of a first control map stored in the memory illustrated in FIG. 2.

FIG. 4 is a control table showing one example of a first control map stored in the memory illustrated in FIG. 2.

FIG. 5 is a control table showing one example of a second control map stored in the memory illustrated in FIG. 2.

FIG. 6 is a control table showing one example of a second control map stored in the memory illustrated in FIG. 2.

FIG. 9 is a control table showing one example of a first control map stored in a first modification of a memory.

FIG. 10 is a control table showing one example of a second control map stored in a second modification of a memory.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
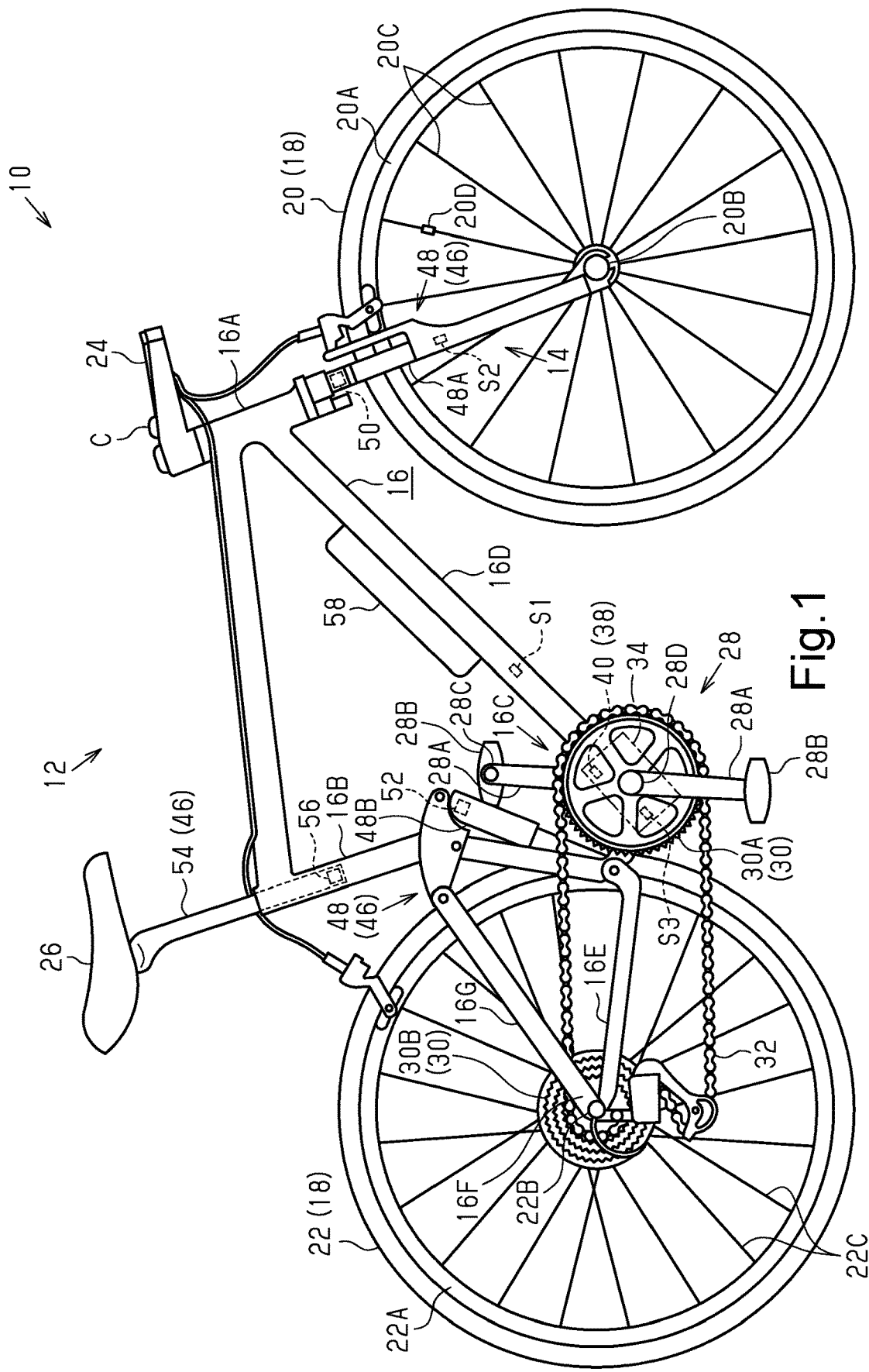
FIG. 1 is a side elevational view of a bicycle including an electric auxiliary drive having a bicycle control device in accordance with a first embodiment.

As shown in FIG. 1, a bicycle 10 includes a bicycle body 12. The bicycle body 12 includes a front fork 14 and a frame 16. The frame 16 includes a head tube 16A, a seat tube 16B, a bottom bracket shell 16C, a down tube 16D, a first swing arm 16E, a rear end 16F and a second swing arm 16G. The bottom bracket shell 16C includes a bottom bracket (not shown).

The bicycle 10 further includes a pair of wheels 18. The wheels 18 include a front wheel 20 and a rear wheel 22. The front wheel 20 includes a rim 20A, a hub 20B and a plurality of spokes 20C. The front wheel 20 is supported by the front fork 14. The rear wheel 22 includes a rim 22A, a hub 22B and a plurality of spokes 22C. The rear wheel 22 is supported by the rear end 16F. The hub 22B of the rear wheel 22 includes a hub shell (not shown) and a rear sprocket support member (not shown). A one-way clutch (not shown) is provided between the hub shell and the rear sprocket support member. The bicycle 10 further includes a handlebar 24. The handlebar 24 is coupled to the head tube 16A. The bicycle 10 further includes a seat 26. The seat 26 is configured to support the buttocks of the rider. In the description hereafter, the terms representing directions are specified based on the frame of reference in which the rider sits on the seat 26 of the bicycle 10 facing the handlebar 24. The terms representing directions are, for example, front, rear, frontward, rearward, left, right, side, up and down.

The bicycle 10 further includes a crank 28. The crank 28 includes a pair of crank arms 28A, a pair of pedals 28B, a pair of pedal support shafts 28C and a crankshaft 28D. The crankshaft 28D is supported by the bottom bracket (not shown) of the bottom bracket shell 16C. The crank arms 28A are coupled to the crankshaft 28D. The pedal support shafts 28C are coupled to the crank arms 28A. The pedals 28B are supported by the pedal support shafts 28C. The bicycle 10 further includes rotary bodies 30 and a chain 32. The rotary bodies 30 include a front sprocket 30A and a plurality of rear sprockets 30B. The front sprocket 30A is coupled to the crank 28. The rear sprockets 30B are coupled to the hub 20B of the rear wheel 22. The chain 32 runs around the front sprocket 30A and one of the rear sprockets 30B. The crank 28 is rotated by pedaling force applied from the rider. The front sprocket 30A rotates together with the crank 28. The chain 32 transmits the rotation of the front sprocket 30A to the rear sprockets 30B. The rear sprockets 30B and the rear wheel 22 are rotated together by the rotation transmitted from the chain 32.

The bicycle 10 further includes an electric auxiliary drive 34. The electric auxiliary drive 34 includes an assist motor 36 (refer to FIG. 2) and a bicycle control device 38. The assist motor 36 assists in rotation of the crank 28. One example of the assist motor 36 is an electric motor. The assist motor 36 has an output shaft, the rotation of which is transmitted to the front sprocket 30A via a speed reduction unit (not shown). In one example, a one-way clutch (not shown) is provided between the assist motor 36 and the front sprocket 30A. The one-way clutch functions to prohibit pedaling force of the rider applied to the crank 28 from transmitting to the assist motor 36.

The operational state of the electric auxiliary drive 34 includes at least one operation mode. Here, the operation mode includes a first operation mode, a second operation mode and a third operation mode. In the first operation mode, the electric auxiliary drive 34 assists in travel of the bicycle 10 at a first assist ratio of a drive force of the assist motor 36 of the electric auxiliary drive 34 to a manual driving force inputted to the bicycle. In the second operation mode, the electric auxiliary drive 34 assists in travel of the bicycle 10 at a second assist ratio of the drive force of the assist motor 36 of the electric auxiliary drive 34 to the manual driving force inputted to the bicycle. The second assist ratio is greater than the first assist ratio. The upper output limit of the assist motor 36 in the second operation mode is greater than the upper output limit of the assist motor 36 in the first operation mode. In the third operation mode, the electric auxiliary drive 34 assists in travel of the bicycle 10 at a third assist ratio of the drive force of the assist motor 36 of the electric auxiliary drive 34 to the manual driving force inputted to the bicycle. The third assist ratio is greater than the first assist ratio. The third assist ratio is greater than the second assist ratio. The upper output limit of the assist motor 36 in the third operation mode is greater than the upper output limit of the assist motor 36 in the second operation mode.

The bicycle control device 38 (hereafter referred to as "the control device 38") includes an electronic controller 40. The electronic controller 40 is preferably a microcomputer that includes one or more processors. In one example, the control device 38 further includes a memory 42 and a bus 44 (refer to FIG. 2). The memory 42 is any computer storage device or any computer readable medium with the sole exception of a transitory, propagating signal. For example, the memory 42 can be nonvolatile memory and volatile memory, and can includes a ROM (Read Only Memory) device, a RAM (Random Access Memory) device, a hard disk, a flash drive, etc. One example of the memory 42 includes a RAM device. The memory 42 stores information and programs used for operating the control device 38. One example is the operation mode of the electric auxiliary drive 34. Examples of structures of the electronic controller 40 and the memory 42 include a first example and a second example described below. In the first example, the electronic controller 40 and the memory 42 are semiconductor chips. The semiconductor chips are mounted on a printed circuit board (not shown) that is included in the control device 38. In the second example, the control device 38 is a semiconductor chip, and the electronic controller 40 and the memory 42 are modules included in the semiconductor chip. The electronic controller 40 and the memory 42 are electrically connected via the bus 44 (refer to FIG. 2). One example of the bus 44 is PCI-Express. The user can access the control device 38 using an input device P (refer to FIG. 2) to transmit signals to the control device 38 for updating and deleting information stored in the memory 42 and for adding information to the memory 42. The control device 38 performs a process of a computer program stored in the memory 42 in accordance with a signal received from the input device P. One example of the input device P is a laptop, a smartphone, a tablet terminal, or a cycle computer. Thus, the control device 38 and the input device P can communicate either through wires or wirelessly.

The bicycle 10 further includes a plurality of bicycle components 46. The bicycle components 46 include suspensions 48 and an adjustable seatpost 54. The suspensions 48 and the adjustable seatpost 54 are operated by electric power. The suspensions 48 absorb shocks applied to the wheels 18 with shock absorbers. One example of a shock absorber includes a spring and a cylinder encapsulating a fluid. The fluid is, for example, air, oil, or a magnetic fluid. The suspensions 48 include a front suspension 48A and a rear suspension 48B. The front suspension 48A is provided on the front fork 14. The front suspension 48A supports the front wheel 20 so as to be movable relative to the frame 16. The rear suspension 48B is provided between the seat tube 16B and the first swing arm 16E. The rear suspension 48B supports the rear wheel 22 so as to be movable relative to the seat tube 16B. The suspensions 48 include a first electric actuator 50 and a second electric actuator 52. The first electric actuator 50 changes the operational state of the front suspension 48A. One example of the first electric actuator 50 is an electric motor. The second electric actuator 52 changes the operational state of the rear suspension 48B. One example of the second electric actuator 52 is an electric motor. The electric auxiliary drive 34, the suspensions 48, and the adjustable seatpost 54 are connected to the bus 44 of the control device 38 so as to perform wired communication or wireless communication.

The operational state of each of the suspensions 48 includes at least one of a movement state, a travel amount, damping force and repulsion force. The movement state of each of the suspensions 48 includes a locked state and an unlocked state of the suspension 48. In the locked state of the front suspension 48A, movement of the front wheel 20 is restricted relative to the frame 16. The locked state of the front suspension 48A can include a state in which the front wheel 20 is slightly moved relative to the frame 16 by strong force applied to the front wheel 20. In the locked state of the rear suspension 48B, movement of the rear wheel 22 is restricted relative to the frame 16. The locked state of the rear suspension 48B can include a state in which the rear wheel 22 is slightly moved relative to the frame 16 by strong force applied to the rear wheel 22. In the unlocked state of the front suspension 48A, the front wheel 20 moves relative to the frame 16. In the unlocked state of the rear suspension 48B, the rear wheel 22 moves relative to the frame 16.

The travel amount of the front suspension 48A is a range in which the front wheel 20 is movable relative to the frame 16. As the travel amount of the front suspension 48A is increased, the range in which the front wheel 20 is movable relative to the frame 16 widens. As the travel amount of the front suspension 48A is decreased, the range in which the front wheel 20 is movable relative to the frame 16 narrows. The travel amount of the rear suspension 48B is a range in which the rear wheel 22 is movable relative to the frame 16. As the travel amount of the rear suspension 48B is increased, the range in which the rear wheel 22 is movable relative to the frame 16 widens. As the travel amount of the rear suspension 48B is decreased, the range in which the rear wheel 22 is movable relative to the frame 16 narrows.

The damping force of each of the suspensions 48 is the strength of an action reducing vibration. As the damping force is increased, the vibration of the suspension 48 is damped at a faster rate. As the damping force is decreased, the vibration of the suspension 48 is damped at a slower rate. The repulsion force of each of the suspensions 48 is the resistance of the shock absorber provided in each of the suspensions 48 against deformation. As the repulsion force is increased, the shock absorber of the suspension 48 is more resistant to deformation. As the repulsion force is decreased, the shock absorber of the suspension 48 is easier to deform.

The adjustable seatpost 54 is supported by the seat tube 16B. The adjustable seatpost 54 is partially inserted into the seat tube 16B. The seat 26 is coupled to the adjustable seatpost 54. The adjustable seatpost 54 is operated to change the height of the seat 26 relative to the frame 16. The adjustable seatpost 54 includes a third electric actuator 56. The third electric actuator 56 changes an operational state of the adjustable seatpost 54 by changing the height of the seat 26 between a plurality of seat positions. One example of the third electric actuator 56 is an electric motor. The operational state of the adjustable seatpost 54 includes the position of the adjustable seatpost 54 (hereafter referred to as "the height of the adjustable seatpost 54") relative to the seat tube 16B in a direction along a center axis of the seat tube 16B. As the height of the adjustable seatpost 54 is increased, the seat 26 is located at a higher position. As the height of the adjustable seatpost 54 is decreased, the seat 26 is located at a lower position.

The bicycle 10 further includes a battery 58. The battery 58 is attached to the down tube 16D. The battery 58 is electrically connected to the electric auxiliary drive 34 and the bicycle components 46. The battery 58 can be electrically connected to the electric auxiliary drive 34 and other components, for example, by a power line (not shown) or a power line for power line communication (not shown). The electric power of the battery 58 is supplied to each of the electric auxiliary drive 34 and the bicycle components 46 by the power line.

Figure 2:
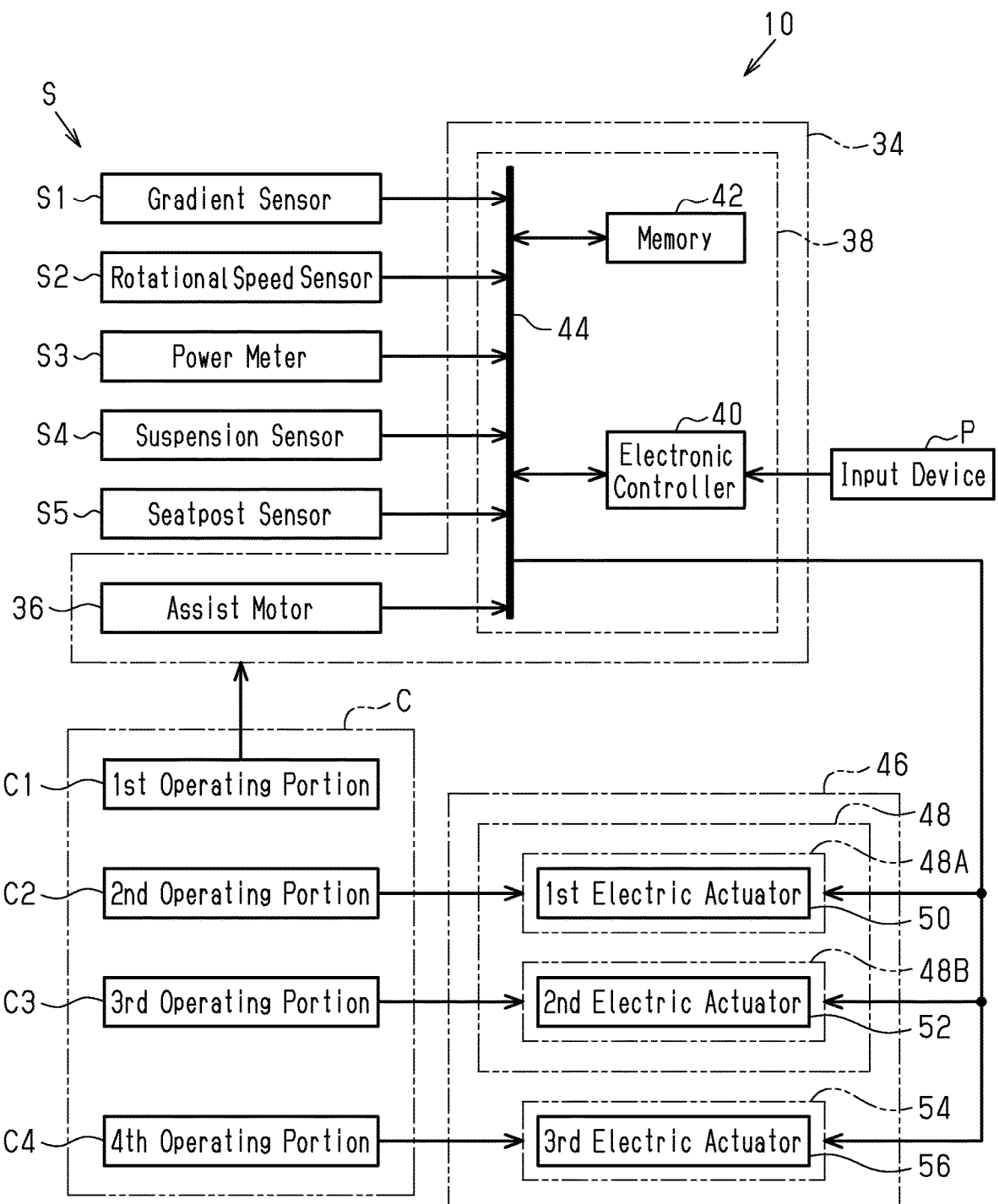
FIG. 2 is a block diagram showing an overall electric bicycle system of the bicycle illustrated in FIG. 1.

The bicycle 10 further includes at least one sensor S for detecting information (refer to FIG. 2). The sensor S includes a gradient sensor S1, a rotational speed sensor S2, a power meter S3, a suspension sensor S4 (refer to FIG. 2), and a seatpost sensor S5 (refer to FIG. 2). Each of the sensors S1 to S5 is connected to the bus 44 of the control device 38 so as to perform wired communication or wireless communication.

The gradient sensor S1 is configured to detect a pitch angle of the frame 16. The mount position of the gradient sensor S1 can be selected from any position of the bicycle 10. One example of the mount position is the frame 16 or the electric auxiliary drive 34. The pitch angle is a rotational angle about a predetermined pitch axis extending along the sideward direction of the bicycle 10. In one example, the gradient sensor S1 detects an angular speed of a pitch angle, calculates the integral value of the detected angular speed, and converts the integral value into the pitch angle. The calculated pitch angle is stored in the memory 42. The electronic controller 40 refers to the pitch angle as a value indicating the gradient of the bicycle 10 in control of the electric auxiliary drive 34 and the bicycle components 46.

The rotational speed sensor S2 is configured to detect a rotational speed of the wheels 18. In one example, the bicycle 10 includes the rotational speed sensor S2 detecting a rotational speed of the front wheel 20. The rotational speed sensor S2 detecting a rotational speed of the front wheel 20 is attached to the front fork 14. A magnet 20D is provided on one of the spokes 20C of the front wheel 20. The rotational speed sensor S2 is configured to detect a rotational speed of the front wheel 20 by detecting the magnet 20D.

The power meter S3 is configured to detect drive power of the bicycle 10. The expression calculating drive power of the bicycle 10 is multiplication of torque applied to the crank 28 and a rotational speed of the crank 28. The power meter S3 includes, for example, a torque sensor (not shown) and a crank rotational speed sensor (not shown). The torque sensor outputs a signal corresponding to torque applied to the crank 28. In one example, the torque sensor includes at least one of a strain sensor, a magnetostriction sensor, and an optical sensor. The crank rotational speed sensor includes at least one of a sensor configured to detect a rotational speed of the crank 28, a sensor configured to detect a rotational speed of the chain 32, and a sensor configured to measure the number of oscillations of the chain 32 during rotation of the front sprocket 30A.

The suspension sensor S4 is configured to detect the operational states of the suspensions 48. In one example, the suspension sensor S4 includes a sensor configured to detect movement states of the suspensions 48 (not shown), a sensor is configured to detect travel amounts of the suspensions 48 (not shown), a sensor configured to detect damping forces of the suspensions 48 (not shown), and a sensor configured to detecting repulsion forces of the suspensions 48 (not shown). In one example, the bicycle 10 includes one or both of a suspension sensor S4 that is configured to detect the operational state of the front suspension 48A, and a suspension sensor S4 that is configured to detect the operational state of the rear suspension 48B. The suspension sensor S4 detecting the operational state of the front suspension 48A is attached to the front suspension 48A. The suspension sensor S4 detecting the operational state of the rear suspension 48B is attached to the rear suspension 48B. The seatpost sensor S5 is configured to detect the height of the adjustable seatpost 54. The seatpost sensor S5 is attached to the adjustable seatpost 54 or the seat tube 16B.

As shown in FIG. 2, the bicycle 10 further includes an operating portion C. The operating portion C includes a first operating portion C1, a second operating portion C2, a third operating portion C3 and a fourth operating portion C4. Each of the operating portions C1, C2, C3, C4 includes a switch (not shown) operable by the rider. Each of the operating portions C1, C2, C3, C4 is connected to the bus 44 of the control device 38 so as to perform wired communication or wireless communication. The operating portion C can function as the input device P. Thus, in the illustrated embodiments, the operating portions C1, C2, C3, C4 are user input devices.

The first operating portion C1 is operated to change the operational state of the electric auxiliary drive 34. The mount position of the first operating portion C1 can be selected from any position of the bicycle 10. In one example, the first operating portion C1 is provided on the handlebar 24 (refer to FIG. 1). If the first operating portion C1 is operated, then the first operating portion C1 transmits a data set to the control device 38. In one example, the data set includes an instruction related to the operational state of the electric auxiliary drive 34.

The second operating portion C2 is operated to change the operational state of the front suspension 48A. The mount position of the second operating portion C2 can be selected from any position of the bicycle 10. In one example, the second operating portion C2 is provided on the handlebar 24. If the second operating portion C2 is operated, then the second operating portion C2 transmits a data set to the control device 38. In one example, the data set includes an instruction related to the operational state of the front suspension 48A.

The third operating portion C3 is operated to change the operational state of the rear suspension 48B. The mount position of the third operating portion C3 can be selected from any position of the bicycle 10. In one example, the third operating portion C3 is provided on the handlebar 24. If the third operating portion C3 is operated, then the third operating portion C3 transmits a data set to the control device 38. In one example, the data set includes an instruction related to the operational state of the rear suspension 48B.

The fourth operating portion C4 is operated to change the operational state of the adjustable seatpost 54. The mount position of the fourth operating portion C4 can be selected from any position of the bicycle 10. In one example, the fourth operating portion C4 is provided on the handlebar 24. If the fourth operating portion C4 is operated, then the fourth operating portion C4 transmits a data set to the control device 38. In one example, the data set includes an instruction related to the operational state of the adjustable seatpost 54.

Examples of changes in the operational states corresponding to operations of the operating portion C will now be described. If an operation for setting the movement state of the front suspension 48A to the locked state is input to the second operating portion C2, then the front suspension 48A is operated to restrict relative movement of the front wheel 20 to the frame 16. If an operation for setting the movement state of the front suspension 48A to the unlocked state is input to the second operating portion C2, then the front suspension 48A is operated to allow relative movement of the front wheel 20 to the frame 16. If an operation for increasing the travel amount of the front suspension 48A is input to the second operating portion C2, then the front suspension 48A is operated to increase the travel amount of the front suspension 48A. If an operation for decreasing the travel amount of the front suspension 48A is input to the second operating portion C2, then the front suspension 48A is operated to decrease the travel amount of the front suspension 48A. If an operation for increasing the damping force of the front suspension 48A is input to the second operating portion C2, then the front suspension 48A is operated to increase the damping force of the front suspension 48A. If an operation for decreasing the damping force of the front suspension 48A is input to the second operating portion C2, then the front suspension 48A is operated to decrease the damping force of the front suspension 48A. If an operation for increasing the repulsion force of the front suspension 48A is input to the second operating portion C2, then the front suspension 48A is operated to increase the repulsion force of the front suspension 48A. If an operation for decreasing the repulsion force of the front suspension 48A is input to the second operating portion C2, then the front suspension 48A is operated to decrease the repulsion force of the front suspension 48A.

The relationship between the operation performed on the third operating portion C3 and the operation of the rear suspension 48B is the same as the relationship between the operation performed on the second operating portion C2 and the operation of the front suspension 48A. If an operation for raising the adjustable seatpost 54 is input to the fourth operating portion C4, then the adjustable seatpost 54 is operated to increase the height of the adjustable seatpost 54.

If an operation for lowering the adjustable seatpost 54 is input to the fourth operating portion C4, then the adjustable seatpost 54 is operated to decrease the height of the adjustable seatpost 54. If an operation for changing the height of the adjustable seatpost 54 is input to the fourth operating portion C4, then the adjustable seatpost 54 can be operated in accordance with a load applied to the seat 26.

The electronic controller 40 controls the operational state of the electric auxiliary drive 34 in an automatic control mode and a manual control mode. The electronic controller 40 is switched between the automatic control mode and the manual control mode based on an operation performed on the operating portion C. In the automatic control mode, the electronic controller 40 controls the operational state of the electric auxiliary drive 34 based on at least the operational states of the suspensions 48. In the manual control mode, the electronic controller 40 controls the operational state of the electric auxiliary drive 34 based on an operation performed on the operating portion C.

The electronic controller 40 controls the operational state of the electric auxiliary drive 34 based on the operational states of the suspensions 48. The electronic controller 40 controls the operational state of the electric auxiliary drive 34 based on at least one of the movement states, the travel amounts, the damping forces and the repulsion forces of the suspensions 48. A detailed example related to the above specific examples includes the following control. The electronic controller 40 controls the operation mode of the electric auxiliary drive 34 based on the operational states of the suspensions 48 and the adjustable seatpost 54.

The detailed example further includes the following examples. In a first example, if the movement states of the suspensions 48 are the locked state, then the electronic controller 40 controls the electric auxiliary drive 34 so that the operation mode is set to the first operation mode. In a second example, if the movement states of the suspensions 48 are the unlocked state, then the electronic controller 40 controls the electric auxiliary drive 34 so that the operation mode is set to the second operation mode. In a third example, if the travel amount of the rear suspension 48B is greater than the travel amount of the front suspension 48A, then the electronic controller 40 controls the electric auxiliary drive 34 so that the operation mode is set to the third operation mode. In a fourth example, if the repulsion force of the rear suspension 48B is greater than the repulsion force of the front suspension 48A, then the electronic controller 40 controls the electric auxiliary drive 34 so that the operation mode is set to the third operation mode.

The memory 42 stores first combination information including a combination of the operational states of the suspensions 48 and the operational state of the electric auxiliary drive 34. One example of the first combination information is a map specifying the relationship between the operational states of the suspensions 48 and the operation mode of the electric auxiliary drive 34 (hereafter referred to as "the first control map"). FIGS. 3 and 4 are examples of the first control map. The memory 42 stores second combination information including a combination of the operational states of the suspensions 48 and the operational state of the adjustable seatpost 54 with the operational state of the electric auxiliary drive 34. One example of the second combination information is a map specifying the relationship between the operational states of the suspensions 48 and the adjustable seatpost 54 and the operation mode of the electric auxiliary drive 34 (hereafter referred to as "the second control map"). As mentioned above, FIGS. 5 and 6 are examples of the second control map. The electronic controller 40 controls the operational state of the electric auxiliary drive 34 based on which one of the first and second control maps that is selected either by the user or by a default setting. Alternatively, the memory 42 can only include one control map. The user can access the memory 42 using the input device P and update contents of the first control map(s) and/or the second control map(s). The electronic controller 40 updates the contents of the first control map(s) and/or the second control map(s) based on information received from the input device P. If more than one control map is stored, the user can select which one of the first and second control maps is to be used by the electronic controller 40 to control on the electric auxiliary drive 34.

First Control Map of FIG. 3

First, the case of the first control map of FIG. 3 being selected to be used by the electronic controller 40 to control the operational state of the electric auxiliary drive 34 based on the operational state of the suspensions 48 of the bicycle 10 will now be discussed. If the electronic controller 40 performs control on the electric auxiliary drive 34, then the electronic controller 40 retrieves the first control map from the memory 42 and sets the operation mode of the electric auxiliary drive 34 based on whether or not a condition specified in the selected (first or second) control map is satisfied. In one example, the parameters setting conditions specified in the first control map include the movement state, the travel amount, and the repulsion force of each of the front suspension 48A and the rear suspension 48B. Each oblique line in FIG. 3 indicates that the content of the corresponding parameter is in any state.

If a first condition is satisfied, then the electronic controller 40 assumes, for example, that the bicycle 10 is traveling on a level road and controls the electric auxiliary drive 34 so that the electric auxiliary drive 34 is operated in the first operation mode. The contents of the first condition are as follows. The movement state of each of the front suspension 48A and the rear suspension 48B is the locked state. The travel amount and the repulsion force of the front suspension 48A are in any state. The travel amount and the repulsion force of the rear suspension 48B are in any state. In this control, if the bicycle 10 is traveling on a level road, a comfortable traveling environment is provided to the rider.

If one of a second condition and a third condition is satisfied, then the electronic controller 40 assumes, for example, that the bicycle 10 is traveling on a rough road surface and controls the electric auxiliary drive 34 so that the electric auxiliary drive 34 is operated in the second operation mode. In the case of the first control map of FIG. 3, the contents of the second condition are as follows. The movement state of each of the front suspension 48A and the rear suspension 48B is the unlocked state. The travel amount of the front suspension 48A is equal to the travel amount of the rear suspension 48B. The repulsion force of each of the front suspension 48A and the rear suspension 48B is in any state. The contents of the third condition are as follows. The movement state of each of the front suspension 48A and the rear suspension 48B is the unlocked state. The travel amount of the front suspension 48A is greater than the travel amount of the rear suspension 48B. The repulsion force of each of the front suspension 48A and the rear suspension 48B is in any state. In this control, if the bicycle 10 is traveling on a rough road surface, a comfortable traveling environment is provided to the rider.

If a fourth condition is satisfied, then the electronic controller 40 assumes, for example, that the bicycle 10 is traveling on an uphill, and controls the electric auxiliary drive 34 so that the electric auxiliary drive 34 is operated in the third operation mode. In the case of the first control map of FIG. 3, the contents of the fourth condition are as follows. The movement state of each of the front suspension 48A and the rear suspension 48B is the unlocked state. The travel amount of the rear suspension 48B is greater than the travel amount of the front suspension 48A. The repulsion force of each of the front suspension 48A and the rear suspension 48B is in any state. In this control, if the bicycle 10 is traveling on an uphill, a comfortable traveling environment is provided to the rider.

First Control Map of FIG. 4

Now, the case of the first control map of FIG. 4 being selected to be used by the electronic controller 40 to control the operational state of the electric auxiliary drive 34 based on the operational state of the suspensions 48 of the bicycle 10 will now be discussed. When the electronic controller 40 performs control on the electric auxiliary drive 34, the electronic controller 40 retrieves the first control map of FIG. 4 from the memory 42 and sets the operation mode of the electric auxiliary drive 34 based on whether or not a condition specified in the first control map of FIG. 4 is satisfied. Each oblique line in FIG. 4 indicates that the content of the corresponding parameter is in any state.

If a fifth condition is satisfied, then the electronic controller 40 assumes, for example, that the bicycle 10 is traveling on a level road and controls the electric auxiliary drive 34 so that the electric auxiliary drive 34 is operated in the first operation mode. The contents of the fifth condition are the same as the contents of the first condition specified in the first control map. In this control, if the bicycle 10 travels on a level road, a comfortable traveling environment is provided to the rider.

If one of a sixth condition and a seventh condition is satisfied, then the electronic controller 40 assumes, for example, that the bicycle 10 is traveling on a rough road surface and controls the electric auxiliary drive 34 so that the electric auxiliary drive 34 is operated in the second operation mode. The contents of the sixth condition are as follows. The movement state of each of the front suspension 48A and the rear suspension 48B is the unlocked state. The travel amount of each of the front suspension 48A and the rear suspension 48B is in any state. The repulsion force of the front suspension 48A is equal to the repulsion force of the rear suspension 48B. The contents of the seventh condition are as follows. The movement state of each of the front suspension 48A and the rear suspension 48B is the unlocked state. The travel amount of each of the front suspension 48A and the rear suspension 48B is in any state. The repulsion force of the front suspension 48A is greater than the repulsion force of the rear suspension 48B. In this control, if the bicycle 10 is traveling on a rough road surface, a comfortable traveling environment is provided to the rider.

If an eighth condition is satisfied, then the electronic controller 40 assumes, for example, that the bicycle 10 is traveling on an uphill and controls the electric auxiliary drive 34 so that the electric auxiliary drive 34 is operated in the third operation mode. The contents of the eighth condition are as follows. The movement state of each of the front suspension 48A and the rear suspension 48B is the unlocked state. The travel amount of each of the front suspension 48A and the rear suspension 48B is in any state. The repulsion force of the rear suspension 48B is greater than the repulsion force of the front suspension 48A. In this control, if the bicycle 10 is traveling on an uphill, a comfortable traveling environment is provided to the rider.

Second Control Map of FIG. 5

Now, the case of the second control map of FIG. 5 being selected to be used by the electronic controller 40 to control the operational state of the electric auxiliary drive 34 based on the operational state of the suspensions 48 of the bicycle 10 and the operational state of the adjustable seatpost 54 of the bicycle 10 will now be discussed. In other words, when the second control map of FIG. 5 is selected, the electronic controller 40 controls the operational state of the electric auxiliary drive 34 based on the operational states of the suspensions 48 and the adjustable seatpost 54. The electronic controller 40 controls the operational state of the electric auxiliary drive 34 based on at least one of the movement states, the travel amounts, and the repulsion forces of the suspensions 48 and the height of the adjustable seatpost 54. A detailed example related to the above specific examples includes the following control. The electronic controller 40 controls the operation mode of the electric auxiliary drive 34 based on the operational states of the suspensions 48 and the adjustable seatpost 54.

The detailed example further includes the following examples. In a first example, if the movement states of the suspensions 48 are the locked state and the height of the adjustable seatpost 54 is included in a first range, the electronic controller 40 controls the electric auxiliary drive 34 so that the operation mode is set to the first operation mode. In a second example, if the movement states of the suspensions 48 are the unlocked state and the height of the adjustable seatpost 54 is included in the first range, the electronic controller 40 controls the electric auxiliary drive 34 so that the operation mode is set to the second operation mode. In a third example, if the travel amount of the rear suspension 48B is greater than the travel amount of the front suspension 48A and the height of the adjustable seatpost 54 is included in a second range that is higher than the first range, the electronic controller 40 controls the electric auxiliary drive 34 so that the operation mode is set to the third operation mode. In a fourth example, if the repulsion force of the rear suspension 48B is greater than the repulsion force of the front suspension 48A and the height of the adjustable seatpost 54 is included in the second range, which is higher than the first range, the electronic controller 40 controls the electric auxiliary drive 34 so that the operation mode is set to the third operation mode.

As mentioned above, the memory 42 stores the second combination information of FIG. 5 that includes a combination of the operational states of the suspensions 48 and the operational state of the adjustable seatpost 54 with the operational state of the electric auxiliary drive 34. The electronic controller 40 controls the operational state of the electric auxiliary drive 34 based on the second control map of FIG. 5 if selected or set by default when there is more than one second control map.

When the electronic controller 40 performs control on the electric auxiliary drive 34, the electronic controller 40 retrieves the second control map of FIG. 5 from the memory 42 and sets the operation mode of the electric auxiliary drive 34 based on whether or not a condition specified in the second control map is satisfied. In one example, the parameters setting conditions specified in the second control map include the movement state, the travel amount, and the repulsion force of each of the front suspension 48A and the rear suspension 48B and the height of the adjustable seatpost 54. Each oblique line in FIG. 5 indicates that the content of the corresponding parameter is in any state.

If a ninth condition is satisfied, then the electronic controller 40 assumes, for example, that the bicycle 10 is traveling on a level road and controls the electric auxiliary drive 34 so that the electric auxiliary drive 34 is operated in the first operation mode. The contents of the ninth condition are as follows. The movement state of each of the front suspension 48A and the rear suspension 48B is the locked state. The travel amount and the repulsion force of the front suspension 48A are in any state. The travel amount and the repulsion force of the rear suspension 48B are in any state. The height of the adjustable seatpost 54 is included in the first range. In this control, in a state where the bicycle 10 is traveling on a level road, a comfortable traveling environment is provided to the rider.

If one of tenth to twelfth conditions is satisfied, then the electronic controller 40 assumes, for example, that the bicycle 10 is traveling on a rough road surface and controls the electric auxiliary drive 34 so that the electric auxiliary drive 34 is operated in the second operation mode. The contents of the tenth condition are as follows. The movement state of each of the front suspension 48A and the rear suspension 48B is the unlocked state. The travel amount and the repulsion force of the front suspension 48A are in any state. The travel amount and the repulsion force of the rear suspension 48B are in any state. The height of the adjustable seatpost 54 is included in the first range. The contents of the eleventh condition are as follows. The movement state of each of the front suspension 48A and the rear suspension 48B is in the unlocked state. The travel amount of the front suspension 48A is equal to the travel amount of the rear suspension 48B. The repulsion force of each of the front suspension 48A and the rear suspension 48B is in any state. The height of the adjustable seatpost 54 is included in the second range. The contents of the twelfth condition are as follows. The movement state of each of the front suspension 48A and the rear suspension 48B is the unlocked state. The travel amount of the front suspension 48A is greater than the travel amount of the rear suspension 48B. The repulsion force of each of the front suspension 48A and the rear suspension 48B is in any state. The height of the adjustable seatpost 54 is included in the second state. In this control, if the bicycle 10 is traveling on a rough road surface, a comfortable traveling environment is provided to the rider.

If a thirteenth condition is satisfied, then the electronic controller 40 assumes, for example, that the bicycle 10 is traveling on an uphill and controls the electric auxiliary drive 34 so that the electric auxiliary drive 34 is operated in the third operation mode. The contents of the thirteenth condition are as follows. The movement state of each of the front suspension 48A and the rear suspension 48B is the unlocked state. The travel amount of the rear suspension 48B is greater than the travel amount of the front suspension 48A. The repulsion force of each of the front suspension 48A and the rear suspension 48B is in any state. The height of the adjustable seatpost 54 is included in the second range. In this control, if the bicycle 10 is traveling on an uphill, a comfortable traveling environment is provided to the rider.

Second Control Map of FIG. 6

Now, the case of the second control map of FIG. 6 being selected to be used by the electronic controller 40 to control the operational state of the electric auxiliary drive 34 based on the operational state of the suspensions 48 of the bicycle 10 and the operational state of the adjustable seatpost 54 of the bicycle 10 will now be discussed. When the electronic controller 40 performs control on the electric auxiliary drive 34, the electronic controller 40 retrieves the second control map of FIG. 6 from the memory 42 and sets the operation mode of the electric auxiliary drive 34 based on whether or not a condition specified in the second control map is satisfied. Each oblique line in FIG. 6 indicates that the content of the corresponding parameter is in any state.

If a fourteenth condition is satisfied, then the electronic controller 40 assumes, for example, that the bicycle 10 is traveling on a level road and controls the electric auxiliary drive 34 so that the electric auxiliary drive 34 is operated in the first operation mode. The contents of the fourteenth condition are the same as the contents of the ninth condition specified in the second control map of the third embodiment. In this control, if the bicycle 10 is traveling on a level road, a comfortable traveling environment is provided to the rider.

If one of fifteenth to seventeenth conditions is satisfied, then the electronic controller 40 assumes, for example, that the bicycle 10 is traveling on a rough road surface and controls the electric auxiliary drive 34 so that the electric auxiliary drive 34 is operated in the second operation mode. The contents of the fifteenth condition are the same as the contents of the tenth condition specified in the second control map of the third embodiment. The contents of the sixteenth condition are as follows. The movement state of each of the front suspension 48A and the rear suspension 48B is the unlocked state. The travel amount of each of the front suspension 48A and the rear suspension 48B is in any state. The repulsion force of the front suspension 48A is equal to the repulsion force of the rear suspension 48B. The height of the adjustable seatpost 54 is included in the second range. The contents of the seventeenth condition are as follows. The movement state of each of the front suspension 48A and the rear suspension 48B is the unlocked state. The travel amount of each of the front suspension 48A and the rear suspension 48B is in any state. The repulsion force of the front suspension 48A is greater than the repulsion force of the rear suspension 48B. The height of the adjustable seatpost 54 is included in the second range. In this control, if the bicycle 10 is traveling on a rough road surface, a comfortable traveling environment is provided to the rider.

If an eighteenth condition is satisfied, then the electronic controller 40 assumes, for example, that the bicycle 10 is traveling on an uphill and controls the electric auxiliary drive 34 so that the electric auxiliary drive 34 is operated in the third operation mode. The contents of the eighteenth condition are as follows. The movement state of each of the front suspension 48A and the rear suspension 48B is the unlocked state. The travel amount of each of the front suspension 48A and the rear suspension 48B is in any state. The repulsion force of the rear suspension 48B is greater than the repulsion force of the front suspension 48A. The height of the adjustable seatpost 54 is included in the second range. In this control, if the bicycle 10 is traveling on an uphill, then a comfortable traveling environment is provided to the rider.

Modifications

The above description illustrates embodiments of a bicycle control device and other devices according to the present invention and is not intended to be restrictive. The embodiments of the bicycle control device and other devices according to the present invention can be modified, for example, as follows. Further, two or more of the modifications can be combined. In the following modifications, the same reference characters are given to those elements that are the same as the corresponding elements of the embodiments. Such elements will not be described in detail.

The process for detecting the operational states of the suspensions 48 can be changed to any process. In a first example, the electronic controller 40 detects the operational state of the front suspension 48A based on a signal transmitted from the second operating portion C2 and detects the operational state of the rear suspension 48B based on a detection result of the suspension sensor S4. In this case, the suspension sensor S4 detecting the operational state of the front suspension 48A can be omitted. In a second example, the electronic controller 40 detects the operational state of the rear suspension 48B based on a signal transmitted from the third operating portion C3 and detects the operational state of the front suspension 48A based on a detection result of the suspension sensor S4. In this case, the suspension sensor S4 detecting the operational state of the rear suspension 48B can be omitted. In a third example, the electronic controller 40 detects the operational state of the front suspension 48A based on a signal transmitted from the second operating portion C2 and detects the operational state of the rear suspension 48B based on a signal transmitted from the third operating portion C3. In this case, the suspension sensors S4 detecting the operational states of the front suspension 48A and the rear suspension 48B can be omitted.

The process for detecting the operational state of the adjustable seatpost 54 can be changed to any process. In one example, the electronic controller 40 detects the operational state of the adjustable seatpost 54 based on a signal transmitted from the fourth operating portion C4. In this case, the seatpost sensor S5 can be omitted.

The bicycle 10 can include a pair of mechanical suspensions instead of the electric suspensions 48. Even in this case, the suspension sensor S4 can detect the operational states of the mechanical suspensions in the same manner as the above embodiments.

The bicycle 10 can include a mechanical adjustable seatpost instead of the electric adjustable seatpost 54. Even in this case, the seatpost sensor S5 can detect the height of the mechanical adjustable seatpost in the same manner as the above embodiments.

Figure 7:
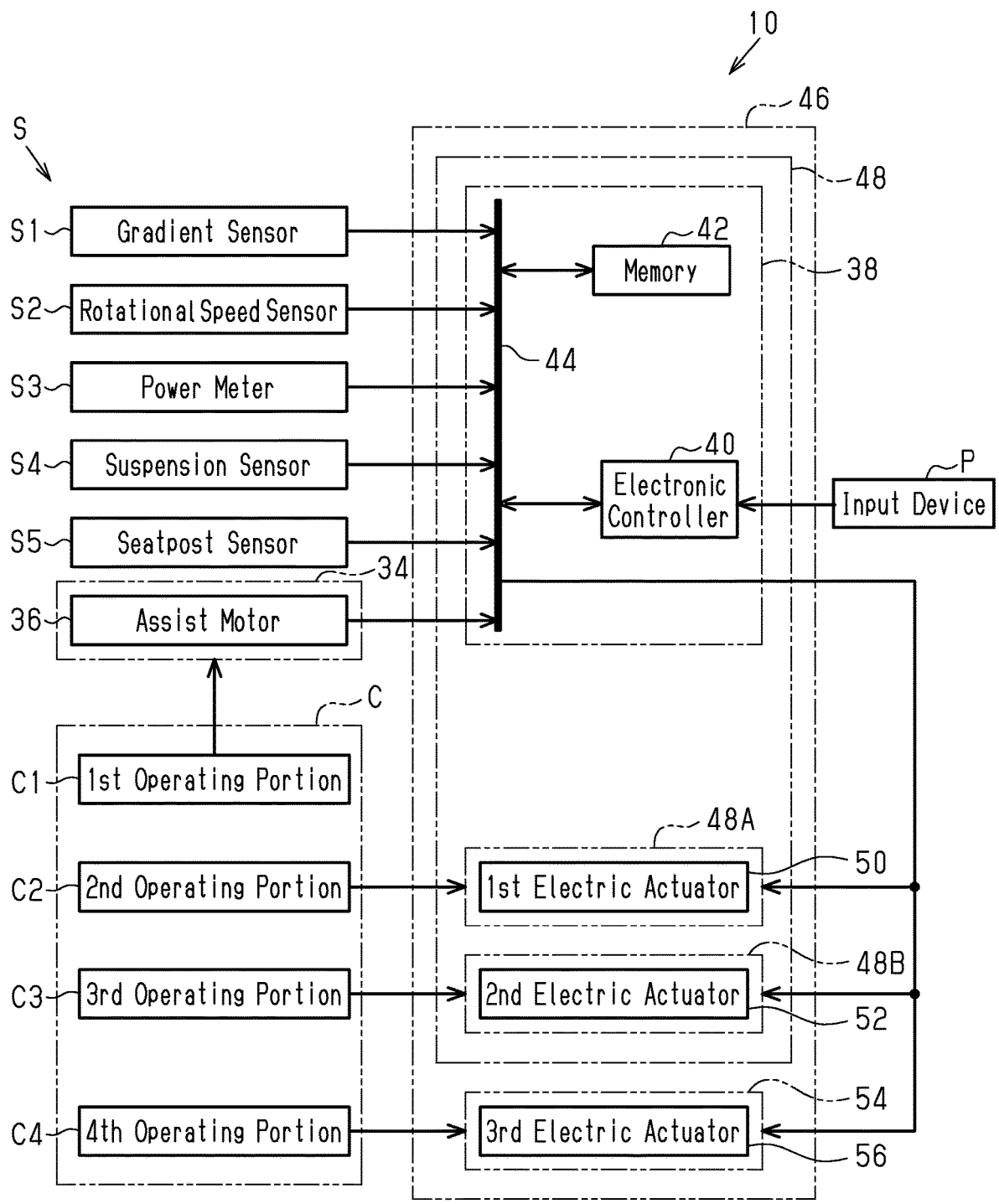
FIG. 7 is a block diagram showing an overall electric bicycle system in accordance with related to a first modification of the bicycle illustrated in FIG. 1.
Figure 8:
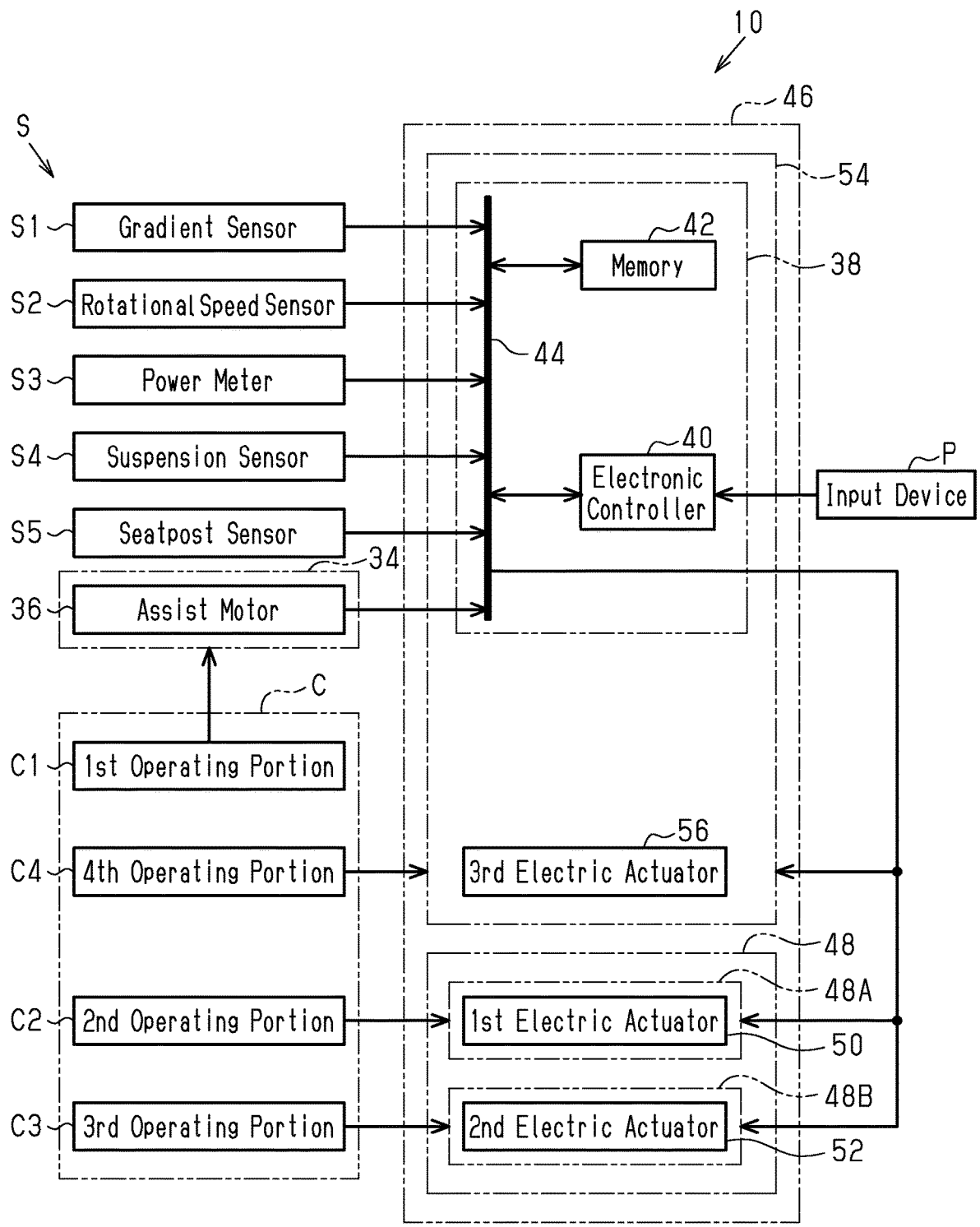
FIG. 8 is a block diagram showing an overall electric bicycle system in accordance with related to a second modification of the bicycle illustrated in FIG. 1.

The sensor S can include a rotational speed sensor that is configured to detect a rotational speed of the rear wheel 22. In one example, the rotational speed sensor is provided on the first swing arm 16E. The mount position of the control device 38 can be changed to any position of the bicycle 10. In a first modification shown in FIG. 7, the control device 38 is provided on the suspensions 48. In this example, the suspensions 48 include the control device 38. More specifically, the control device 38 is provided on one or both of the front suspension 48A and the rear suspension 48B. In a second modification shown in FIG. 8, the control device 38 is provided on the adjustable seatpost 54. In this example, the adjustable seatpost 54 includes the control device 38.

The relationship between the condition and the operation mode specified in the first control map of the first embodiment can be changed to any relationship. In a first example, if the first condition is satisfied, then the electronic controller 40 controls the electric auxiliary drive 34 so that the operation mode is set to the second operation mode or the third operation mode. In a second example, if one of the second condition and the third condition is satisfied, then the electronic controller 40 controls the electric auxiliary drive 34 so that the operation mode is set to the first operation mode or the third operation mode. In a third example, if the fourth condition is satisfied, then the electronic controller 40 controls the electric auxiliary drive 34 so that the operation mode is set to the first operation mode or the second operation mode.

The relationship between the condition and the operation mode specified in the first control map of FIG. 4 can be changed to any relationship. In a first example, if the fifth condition is satisfied, then the electronic controller 40 controls the electric auxiliary drive 34 so that the operation mode is set to the second operation mode or the third operation mode. In a second example, if one of the sixth condition and the seventh condition is satisfied, then the electronic controller 40 controls the electric auxiliary drive 34 so that the operation mode is set to the first operation mode or the third operation mode. In a third example, if the eighth condition is satisfied, then the electronic controller 40 controls the electric auxiliary drive 34 so that the operation mode is set to the first operation mode or the second operation mode.

The relationship between the condition and the operation mode specified in the second control map of FIG. 5 can be changed to any relationship. In a first example, if the ninth condition is satisfied, then the electronic controller 40 controls the electric auxiliary drive 34 so that the operation mode is set to the second operation mode or the third operation mode. In a second example, in a state where one of the tenth to twelfth conditions is satisfied, the electronic controller 40 controls the electric auxiliary drive 34 so that the operation mode is set to the first operation mode or the third operation mode. In a third example, if the thirteenth condition is satisfied, then the electronic controller 40 controls the electric auxiliary drive 34 so that the operation mode is set to the first operation mode or the second operation mode.

The relationship between the condition and the operation mode specified in the second control map of FIG. 6 can be changed to any relationship. In a first example, if the fourteenth condition is satisfied, then the electronic controller 40 controls the electric auxiliary drive 34 so that the operation mode is set to the second operation mode or the third operation mode. In a second example, if one of the fifteenth to seventeenth conditions is satisfied, then the electronic controller 40 controls the electric auxiliary drive 34 so that the operation mode is set to the first operation mode or the third operation mode. In a third example, if the eighteenth condition is satisfied, the electronic controller 40 controls the electric auxiliary drive 34 so that the operation mode is set to the first operation mode or the second operation mode.

The contents of the operation mode of the electric auxiliary drive 34 can be changed to any contents. In a first example, the operation mode includes the first operation mode and does not include the second operation mode and the third operation mode. In a second example, the operation mode includes the first operation mode and the second operation mode and does not include the third operation mode. In a third example, the operation mode includes the second operation mode and does not include the first operation mode and the third operation mode. In a fourth example, the operation mode includes the second operation mode and the third operation mode and does not include the first operation mode. In a fifth example, the operation mode includes the third operation mode and does not include the first operation mode and the second operation mode.

The parameters referred to by the electronic controller 40 in control of the electric auxiliary drive 34 can be changed to any parameters. In one example, the electronic controller 40 further refers to at least one of pedaling information and rotation information. The pedaling information is information related to driving force transmitted in a driving force transmission path extending from the pedals 28B to the rear wheel 22. More specifically, the pedaling information is information related to driving force applied to the crank arms 28A, the pedals 28B, the pedal support shafts 28C, the crankshaft 28D, the front sprocket 30A, the rear sprocket 30B, the chain 32, the hub shell, the rear sprocket support member, the one-way clutch, the rim 22A, and the plurality of spokes 22C. The rotation information is information related to rotations of the pedals 28B, the crank arms 28A, the front sprocket 30A, the rear sprocket 30B, the hub shell, a rear derailleur pulley (not shown), and the chain 32. If at least one of the pedaling information and the rotation information is referred to in control of the electric auxiliary drive 34, the pedaling of the rider is assisted to achieve efficient pedaling.

The contents of the first control map can be changed to any contents. FIG. 9 is one example of the first control map of a first modification. If the electronic controller 40 performs control on the electric auxiliary drive 34, then the electronic controller 40 retrieves the first control map from the memory 42 and sets the operation mode of the electric auxiliary drive 34 based on whether or not a condition specified in the first control map is satisfied. Each oblique line in FIG. 9 indicates that the content of the corresponding parameter is in any state.

If a nineteenth condition is satisfied, then the electronic controller 40 assumes, for example, that the bicycle 10 is traveling on a level road and controls the electric auxiliary drive 34 so that the electric auxiliary drive 34 is operated in the first operation mode. The contents of the nineteenth condition are the same as the contents of the first condition specified in the first control map of FIG. 3. In this control, if the bicycle 10 is traveling on a level road, a comfortable travel condition is provided to the rider.

If one of twentieth to twenty-third conditions is satisfied, then the electronic controller 40 assumes, for example, that the bicycle 10 is traveling on a rough road surface and controls the electric auxiliary drive 34 so that the electric auxiliary drive 34 is operated in the second operation mode. The contents of the twentieth condition are as follows. The movement state of each of the front suspension 48A and the rear suspension 48B is the unlocked state. The travel amount of the front suspension 48A is equal to the travel amount of the rear suspension 48B. The repulsion force of the front suspension 48A is equal to the repulsion force of the rear suspension 48B. The contents of the twenty-first condition are as follows. The movement state of each of the front suspension 48A and the rear suspension 48B is the unlocked state. The travel amount of the front suspension 48A is equal to the travel amount of the rear suspension 48B. The repulsion force of the front suspension 48A is greater than the repulsion force of the rear suspension 48B. The contents of the twenty-second condition are as follows. The movement state of each of the front suspension 48A and the rear suspension 48B is the unlocked state. The travel amount of the front suspension 48A is greater than the travel amount of the rear suspension 48B. The repulsion force of the front suspension 48A is equal to the repulsion force of the rear suspension 48B. The contents of the twenty-third condition are as follows. The movement state of each of the front suspension 48A and the rear suspension 48B is the unlocked state. The travel amount of the front suspension 48A is greater than the travel amount of the rear suspension 48B. The repulsion force of the front suspension 48A is greater than the repulsion force of the rear suspension 48B. In this control, if the bicycle 10 is traveling on a rough road surface, a comfortable traveling environment is provided to the rider.

If one of twenty-fourth to twenty-eighth conditions is satisfied, then the electronic controller 40 assumes, for example, that the bicycle 10 is traveling on an uphill and controls the electric auxiliary drive 34 so that the electric auxiliary drive 34 is operated in the third operation mode. The contents of the twenty-fourth condition are as follows. The movement state of each of the front suspension 48A and the rear suspension 48B is the unlocked state. The travel amount of the rear suspension 48B is greater than the travel amount of the front suspension 48A. The repulsion force of the front suspension 48A is equal to the repulsion force of the rear suspension 48B. The contents of the twenty-fifth condition are as follows. The movement state of each of the front suspension 48A and the rear suspension 48B is the unlocked state. The travel amount of the rear suspension 48B is greater than the travel amount of the front suspension 48A. The repulsion force of the front suspension 48A is greater than the repulsion force of the rear suspension 48B. The contents of the twenty-sixth condition are as follows. The movement state of each of the front suspension 48A and the rear suspension 48B is the unlocked state. The travel amount of the rear suspension 48B is greater than the travel amount of the front suspension 48A. The repulsion force of the rear suspension 48B is greater than the repulsion force of the front suspension 48A. The contents of the twenty-seventh condition are as follows. The movement state of each of the front suspension 48A and the rear suspension 48B is the unlocked state. The travel amount of the front suspension 48A is equal to the travel amount of the rear suspension 48B. The repulsion force of the rear suspension 48B is greater than the repulsion force of the front suspension 48A. The contents of the twenty-eighth condition are as follows. The movement state of each of the front suspension 48A and the rear suspension 48B is the unlocked state. The travel amount of the front suspension 48A is greater than the travel amount of the rear suspension 48B. The repulsion force of the rear suspension 48B is greater than the repulsion force of the front suspension 48A. In this control, if the bicycle 10 is traveling on an uphill, a comfortable traveling environment is provided to the rider.

The contents of the second control map can be changed to any contents. FIG. 10 is one example of the second control map of a modification. When the electronic controller 40 performs control on the electric auxiliary drive 34, the electronic controller 40 retrieves the second control map of FIG. 10 from the memory 42 and sets the operation mode of the electric auxiliary drive 34 based on whether or not a condition specified in the second control map is satisfied. Each oblique line in FIG. 10 indicates that the content of the corresponding parameter is in any state.

If a twenty-ninth condition is satisfied, then the electronic controller 40 assumes, for example, that the bicycle 10 is traveling on a level road and controls the electric auxiliary drive 34 so that the electric auxiliary drive 34 is operated in the first operation mode. The contents of the twenty-ninth condition are the same as the contents of the ninth condition specified in the second control map of the third embodiment. In this control, if the bicycle 10 is traveling on a level road, a comfortable traveling environment is provided to the rider.

If one of thirtieth to thirty-fifth conditions is satisfied, then the electronic controller 40 assumes, for example, that the bicycle 10 is traveling on a rough road surface and controls the electric auxiliary drive 34 so that the electric auxiliary drive 34 is operated in the second operation mode. The contents of the thirtieth condition are the same as the contents of the tenth condition specified in the second control map of the third embodiment. The contents of the thirty-first condition are as follows. The movement state of each of the front suspension 48A and the rear suspension 48B is the locked state. The travel amount and the repulsion force of the front suspension 48A are in any state. The travel amount and the repulsion force of the rear suspension 48B are in any state. The height of the adjustable seatpost 54 is included in the second range. The contents of the thirty-second condition are as follows. The movement state of each of the front suspension 48A and the rear suspension 48B is the unlocked state. The travel amount of the front suspension 48A is equal to the travel amount of the rear suspension 48B. The repulsion force of the front suspension 48A is equal to the repulsion force of the rear suspension 48B. The height of the adjustable seatpost 54 is included in the second range. The contents of the thirty-third condition are as follows. The movement state of each of the front suspension 48A and the rear suspension 48B is the unlocked state. The travel amount of the front suspension 48A is equal to the travel amount of the rear suspension 48B. The repulsion force of the front suspension 48A is greater than the repulsion force of the rear suspension 48B. The height of the adjustable seatpost 54 is included in the second range. The contents of the thirty-fourth condition are as follows. The movement state of each of the front suspension 48A and the rear suspension 48B is the unlocked state. The travel amount of the front suspension 48A is greater than the travel amount of the rear suspension 48B. The repulsion force of the front suspension 48A is equal to the repulsion force of the rear suspension 48B. The height of the adjustable seatpost 54 is included in the second range. The contents of the thirty-fifth condition are as follows. The movement state of each of the front suspension 48A and the rear suspension 48B is the unlocked state. The travel amount of the front suspension 48A is greater than the travel amount of the rear suspension 48B. The repulsion force of the front suspension 48A is greater than the repulsion force of the rear suspension 48B. The height of the adjustable seatpost 54 is included in the second range. In this control, if the bicycle 10 is traveling on a rough road surface, a comfortable traveling environment is provided to the rider.

If one of thirty-sixth to fortieth conditions is satisfied, then the electronic controller 40 assumes, for example, that the bicycle 10 is traveling on an uphill and controls the electric auxiliary drive 34 so that the electric auxiliary drive 34 is operated in the third operation mode. The contents of the thirty-sixth condition are as follows. The movement state of each of the front suspension 48A and the rear suspension 48B is the unlocked state. The travel amount of the rear suspension 48B is greater than the travel amount of the front suspension 48A. The repulsion force of the front suspension 48A is equal to the repulsion force of the rear suspension 48B. The height of the adjustable seatpost 54 is included in the second range. The contents of the thirty-seventh condition are as follows. The movement state of each of the front suspension 48A and the rear suspension 48B is the unlocked state. The travel amount of the rear suspension 48B is greater than the travel amount of the front suspension 48A. The repulsion force of the front suspension 48A is greater than the repulsion force of the rear suspension 48B. The height of the adjustable seatpost 54 is included in the second range. The contents of the thirty-eighth condition are as follows. The movement state of each of the front suspension 48A and the rear suspension 48B is the unlocked state. The travel amount of the rear suspension 48B is greater than the travel amount of the front suspension 48A. The repulsion force of the rear suspension 48B is greater than the repulsion force of the front suspension 48A. The height of the adjustable seatpost 54 is included in the second range. The contents of the thirty-ninth condition are as follows. The movement state of each of the front suspension 48A and the rear suspension 48B is the unlocked state. The travel amount of the front suspension 48A is equal to the travel amount of the rear suspension 48B. The repulsion force of the rear suspension 48B is greater than the repulsion force of the front suspension 48A. The height of the adjustable seatpost 54 is included in the second range. The contents of the fortieth condition are as follows. The movement state of each of the front suspension 48A and the rear suspension 48B is the unlocked state. The travel amount of the front suspension 48A is greater than the travel amount of the rear suspension 48B. The repulsion force of the rear suspension 48B is greater than the repulsion force of the front suspension 48A. The height of the adjustable seatpost 54 is included in the second range. In this control, if the bicycle 10 is traveling on an uphill, a comfortable traveling environment is provided to the rider.

What is claimed is:

1. A bicycle control device comprising:
an electronic controller configured to control an operational state of an electric auxiliary drive capable of adding assistance to a manual driving force inputted to the bicycle, the electric auxiliary drive assists in travel of a bicycle based on an operational state of a suspension of the bicycle,
the electronic controller controlling the operational state of the electric auxiliary drive to the manual driving force so that the bicycle is assisted at an assist ratio of the electric auxiliary drive based on the operational state of the suspension of the bicycle.

2. The bicycle control device according to claim 1, wherein
the operational state of the suspension includes at least one of a movement state, a travel amount, a damping force and a repulsion force, and
the electronic controller is configured to control the operational state of the electric auxiliary drive based on at least one of the movement state, the travel amount, the damping three and the repulsion three of the suspension.

3. The bicycle control device according to claim 2, wherein
the operational state of the electric auxiliary drive includes an operation mode, and
the electronic controller is configured to control the operation mode based on the operational state of the suspension.

4. The bicycle control device according to claim 1, further comprising
a memory storing first combination information including a combination of the operational state of the suspension and the operational state of the electric auxiliary drive,
the electronic controller being configured to control the operational state of the electric auxiliary drive based on the operational state of the suspension and the first combination information.

5. The bicycle control device according to claim 4, wherein
the electronic controller is configured to update the first combination information based on information received from an input device.

6. The bicycle control device according to claim 1, wherein
the electronic controller is configured to control the operational state of the electric auxiliary drive based on the operational state of the suspension and an operational state of an adjustable seatpost.

7. The bicycle control device according to claim 6, wherein
the operational state of the suspension includes at least one of a movement state, a travel amount, a damping force and a repulsion force,
the operational state of the adjustable seatpost includes a height of the adjustable seatpost, and
the electronic controller is configured to control the operational state of the electric auxiliary drive based on at least one of the movement state, the travel amount, the damping force and the repulsion force of the suspension and the height of the adjustable seatpost.

8. The bicycle control device according to claim 7, wherein
the operational state of the electric auxiliary drive includes an operation mode, and
the electronic controller is configured to control the operation mode based on the operational state of the suspension and the operational state of the adjustable seatpost.

9. The bicycle control device according to claim 6, further comprising
a memory storing second combination information including a combination of the operational state of the suspension and the operational state of the adjustable seatpost with the operational state of the electric auxiliary drive,
the electronic controller being configured to controls the operational state of the electric auxiliary drive based on the operational state of the suspension, the operational state of the adjustable seatpost and the second combination information.

10. The bicycle control device according to claim 9, wherein
the electronic controller is configured to update the second combination information based on information received from an input device.

11. The bicycle control device according to claim 6, wherein
the adjustable seatpost includes an electric actuator changing the operational state of the adjustable seatpost.

12. The bicycle control device according to claim 1, wherein
the suspension includes an electric actuator changing the operational state of the suspension.

13. A bicycle comprising the bicycle control device according to claim 1, wherein
the electric auxiliary drive assists in travel of the bicycle.

* * * * *